United States Patent [19]

Ha

[11] Patent Number: 5,231,837
[45] Date of Patent: Aug. 3, 1993

[54] CRYOGENIC DISTILLATION PROCESS FOR THE PRODUCTION OF OXYGEN AND NITROGEN

[75] Inventor: Bao Ha, Vacaville, Calif.

[73] Assignee: Liquid Air Engineering Corporation, Montreal, Canada

[21] Appl. No.: 775,581

[22] Filed: Oct. 15, 1991

[51] Int. Cl.$^5$ .............................................. F25J 3/02
[52] U.S. Cl. ........................................ 62/24; 62/18; 62/22; 62/31; 62/39
[58] Field of Search ................... 62/18, 22, 24, 31, 39

[56] References Cited

U.S. PATENT DOCUMENTS

| | | | |
|---|---|---|---|
| 3,731,495 | 5/1973 | Coveney | 62/13 X |
| 4,224,045 | 9/1980 | Olszewski et al. | |
| 4,433,989 | 2/1984 | Erickson | 62/31 X |
| 4,464,191 | 8/1984 | Erickson | 62/42 X |
| 4,533,375 | 8/1985 | Erickson | 62/31 X |
| 4,560,397 | 12/1985 | Cheung | 62/31 X |
| 4,578,095 | 3/1986 | Erickson | 62/31 X |
| 4,605,427 | 8/1986 | Erickson | 62/31 X |
| 4,737,177 | 4/1988 | Erickson | 62/27 X |
| 4,781,739 | 11/1988 | Erickson | 62/31 X |
| 4,871,382 | 10/1989 | Thorogood et al. | 62/24 X |
| 4,977,746 | 12/1990 | Grenier et al. | 62/24 X |
| 5,049,173 | 9/1991 | Cormier, Sr. et al. | 62/22 X |
| 5,069,699 | 12/1991 | Agrawal | 62/24 |
| 5,081,845 | 1/1992 | Allam et al. | 62/24 |

FOREIGN PATENT DOCUMENTS

| | | |
|---|---|---|
| 0042676A1 | 12/1981 | European Pat. Off. |
| 1209988 | 9/1959 | France |
| 2182785 | 12/1973 | France |
| WO85/04000 | 9/1985 | PCT Int'l Appl. |

OTHER PUBLICATIONS

"Low-Purity Oxygen Production Study", Electric Power Research Institute (EPRI), EPRI AP-3499, Project 2221-2 Final Report (May, 1984).

Primary Examiner—Henry A. Bennet
Assistant Examiner—Christopher B. Kilner
Attorney, Agent, or Firm—Oblon, Spivak, McClelland, Maier & Neustadt

[57] ABSTRACT

A cryogenic distillation process for the production of oxygen and nitrogen is provided, which entails:

a) providing a feed stream of clean, dry and compressed air, b) cooling at least a fraction of the compressed air and introducing the same into a high pressure column, and separating the same into nitrogen-rich stream at the top of the column and an oxygen-rich stream at the bottom of the column, wherein the overhead of the high pressure column exchanges heat with both the bottom of the low pressure column and the bottom of an intermediate column, c) introducing at least a fraction of the oxygen-rich stream into the intermediate column to afford a top liquid fraction A and a bottom liquid fraction B, the overhead of the intermediate column exchanging heat with the low pressure column at a location above the bottom reboiler of the low pressure column, wherein the pressure of the intermediate column is lower than the high pressure column but higher than the low pressure column, d) introducing at least a fraction of the liquid fractions A and B into the low pressure column as feed, e) feeding at least a fraction of the nitrogen-rich stream of step b) to the low pressure column as reflux, and f) recovering an oxygen-rich stream product at the bottom of the low pressure column and a low pressure nitrogen-rich stream at the top of the low pressure which further comprises recovering a medium pressure nitrogen stream column.

29 Claims, 5 Drawing Sheets

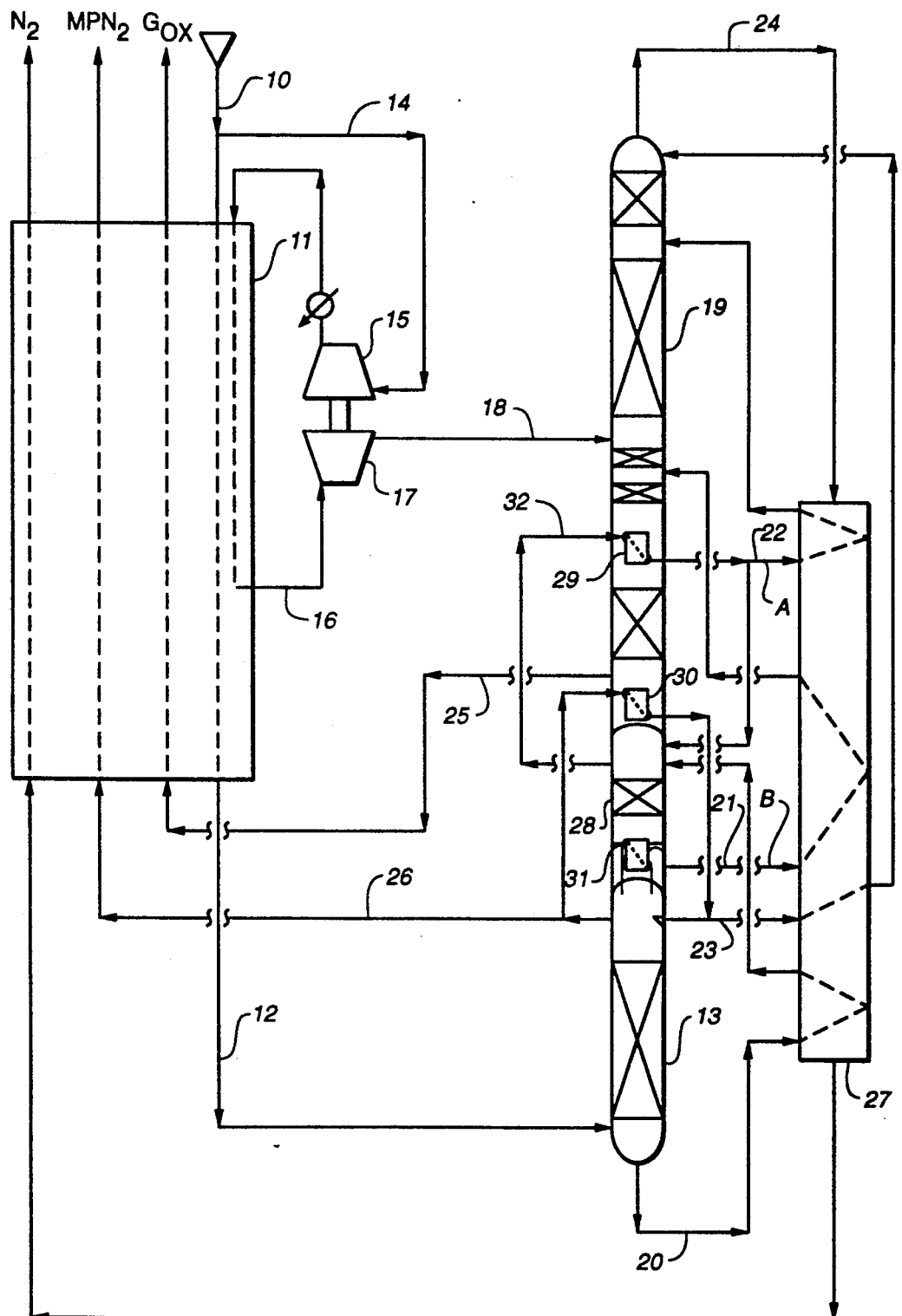
FIG._1

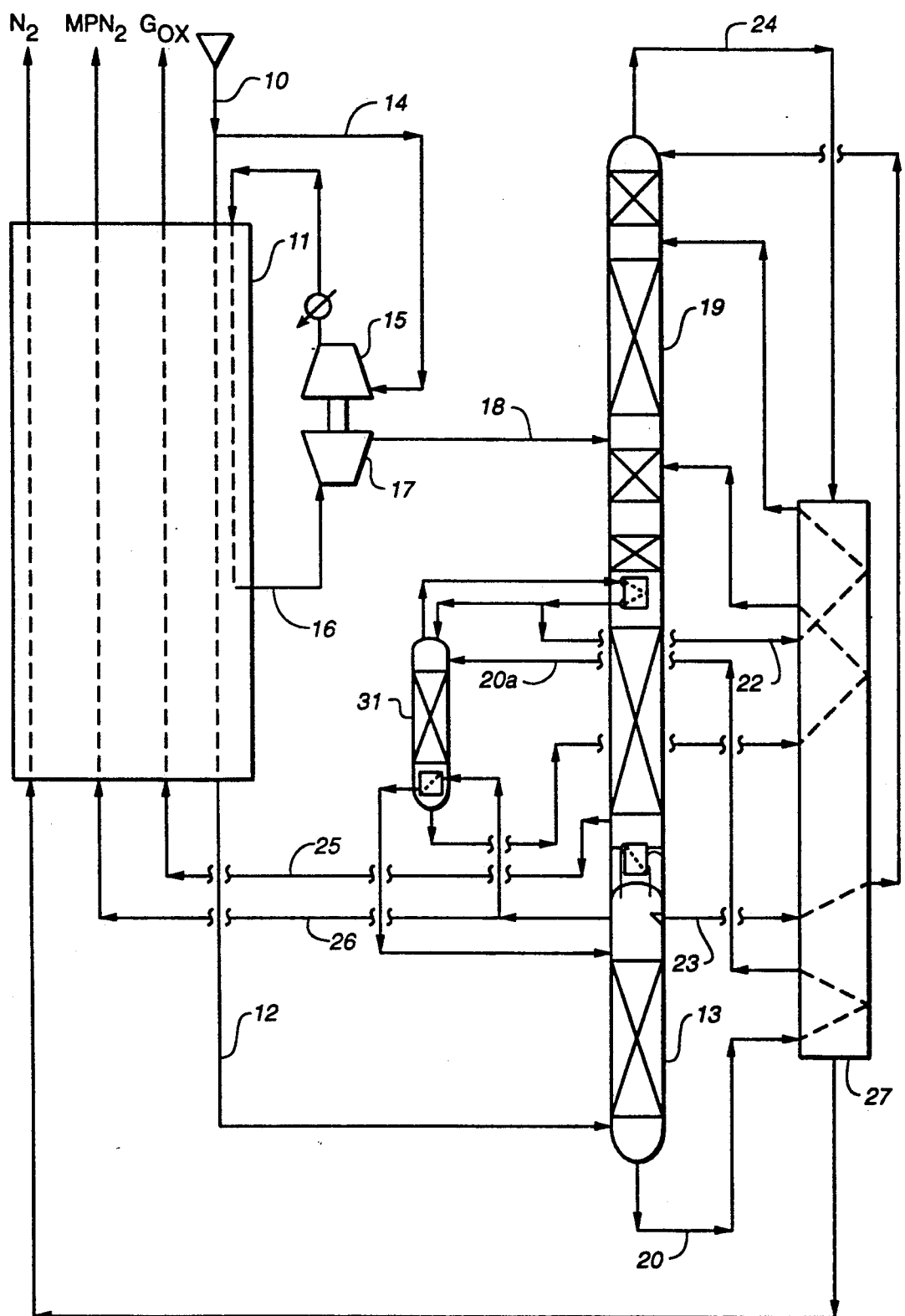
FIG._2

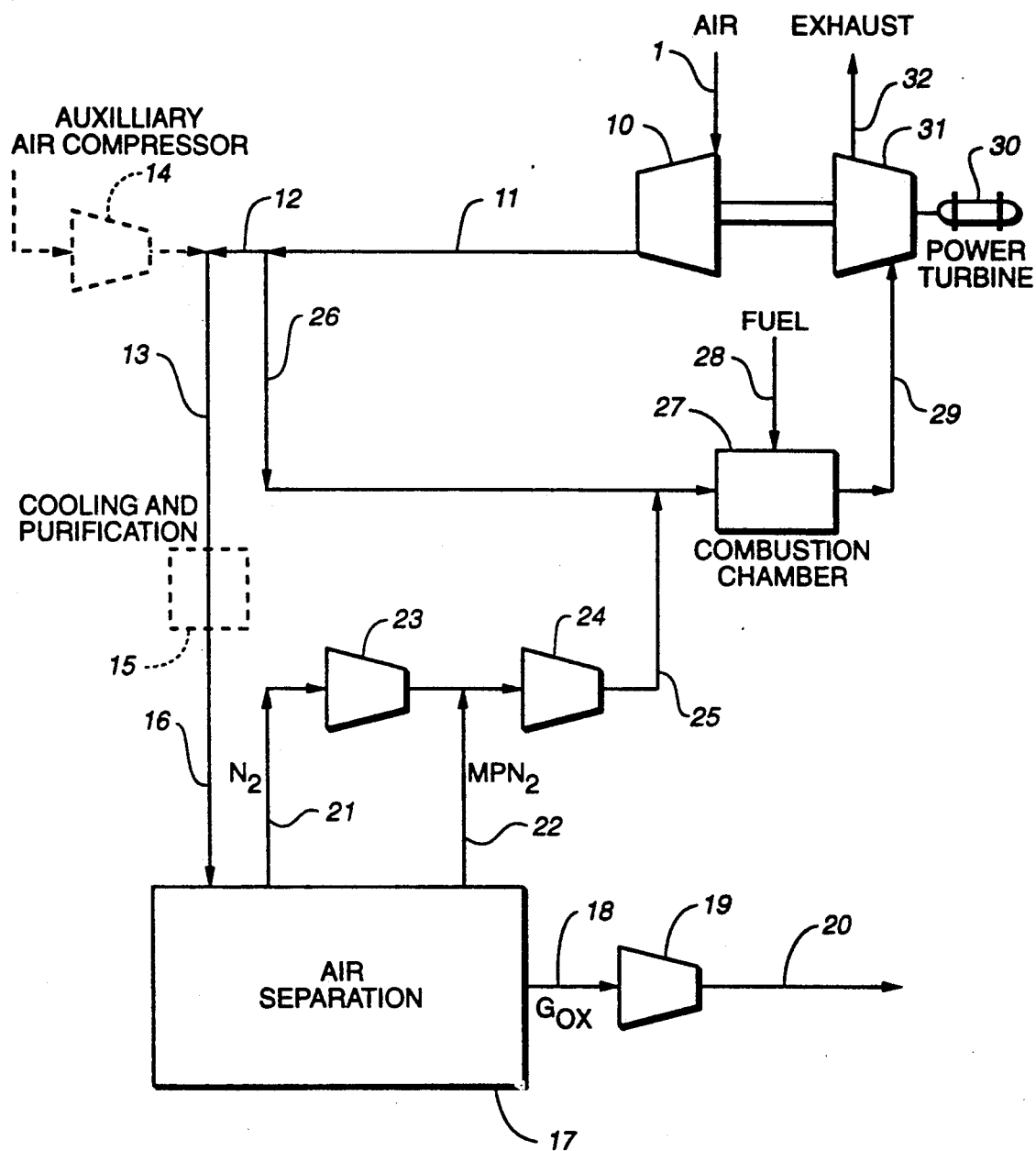
FIG._3

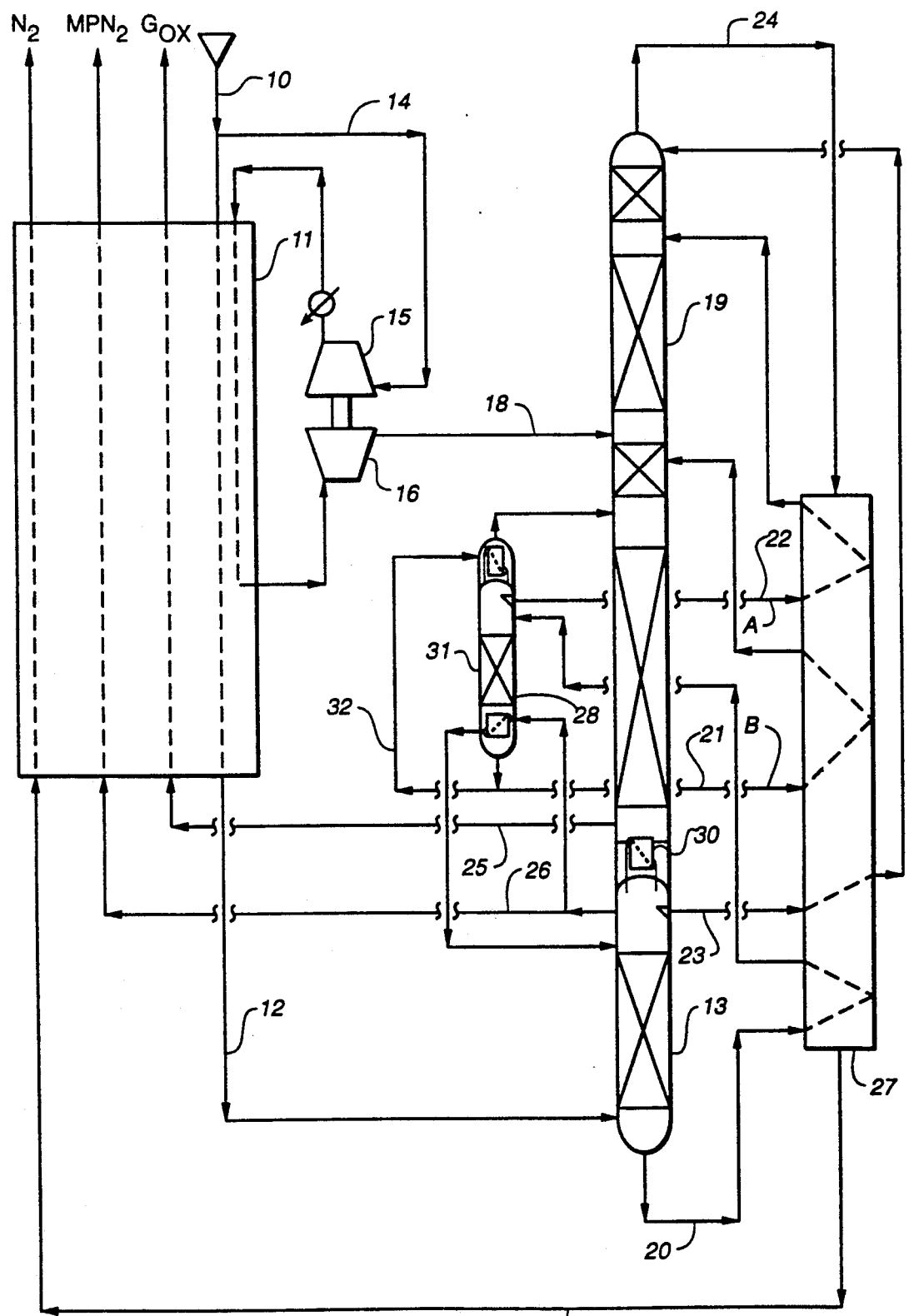
FIG._4

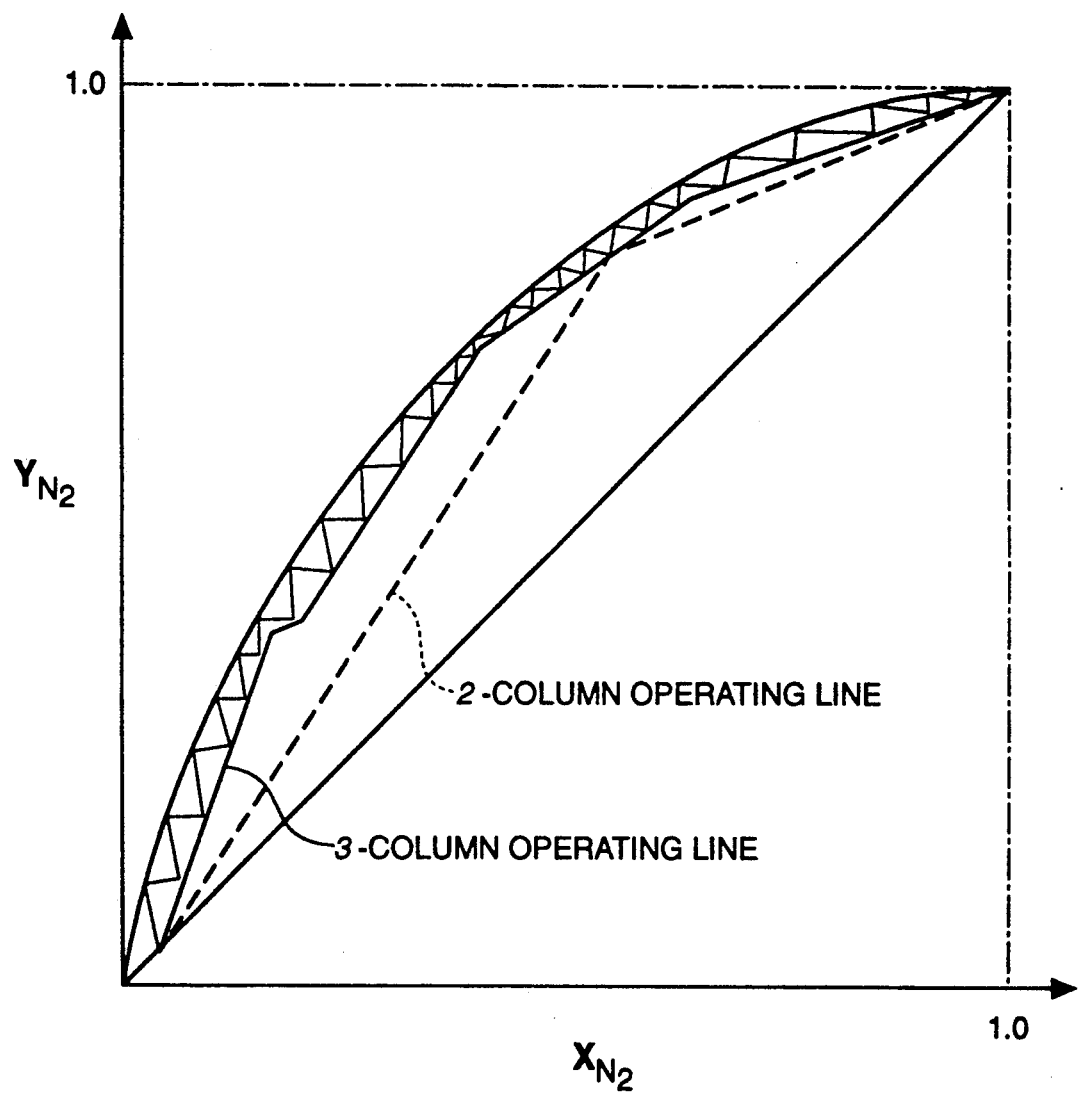
FIG._5

CRYOGENIC DISTILLATION PROCESS FOR THE PRODUCTION OF OXYGEN AND NITROGEN

BACKGROUND OF THE INVENTION

1. Field of the Invention

The present invention relates to an improved cryogenic distillation process for the production of oxygen and nitrogen and the integration thereof with a gas turbine.

2. Description of the Background

A conventional process for cryogenic separation of air components entails two distillation columns, one being a higher pressure column having the upper end in heat exchange relation with the lower end of a lower pressure column. Cold compressed air is separated into nitrogen-rich and oxygen-rich liquids in the higher pressure column. Thereafter, these liquids are fed to the lower pressure column to yield an oxygen product and a nitrogen product. This process is most efficient when the oxygen pressure is relatively low, on the order of about 1 to 2 bar.

U.S. Pat. No. 4,224,045 describes the use of air derived from a power turbine as air feed for an oxygen plant using a conventional two column process. Since the optimum air pressure of a power turbine is quite high, such as 10 to 18 bar absolute, the conventional/classical double column process must operate under elevated pressure in the high pressure column and low pressure column, thus, producing oxygen and nitrogen under pressures of 2 to 7 bar absolute. Relatively good overall efficiency is achieved when the nitrogen product as well as the oxygen product are recompressed to higher pressure for further integration with the associated process, such as coal gasification, and direct reduction for steel making or power generation, for example.

Unfortunately, this process has a major drawback in that the oxygen recovery is quite poor when the double column process is operated at elevated pressure. For example, an air pressure of 16 bar will yield an oxygen recovery of about 90% for 95% oxygen purity and about 5 bar absolute oxygen pressure. For 98% oxygen content, the recovery drops to about 80% for the same air and oxygen pressure. Conventional air separation plants operated at 6 bar absolute air pressure typically yield a recovery in excess of 99% of a purity of about 99.5%. The low recovery results in higher power consumption and larger equipment size.

U.S. Pat. No. 3,731,495 describes a two column apparatus and process for air separation with a nitrogen-quenched power turbine. In this process, air is separated by low temperature rectification using a 150-400 psia. column and a 45-140 psia. column with nitrogen-rich gas from the latter quenching hot combustion gas prior to work expansion of the resulting intermediate temperature gas mixture. However, as this process uses a double column, it suffers from the same disadvantages as that of U.S. Pat. No. 4,224,045.

U.S. Pat. No. 4,947,649 describes a single column process with a nitrogen recycle stream. In this process high pressure air is condensed at the bottom of the column and is fed directly to the column. The nitrogen product is compressed and a fraction is recycled back to the process to serve as additional reboil and reflux for the distillation column. The product recovery can be adjusted by varying the recycle flow rate. This process yields only a small improvement of about 1% in overall power consumption over the process disclosed in U.S. Pat. No. 4,224,045.

Thus, a need exists for a cryogenic distillation process and apparatus for the production and apparatus of oxygen and nitrogen at elevated air pressure. A need also exists for such a process and apparatus which can be used efficiently in combination with a gas turbine.

SUMMARY OF THE INVENTION

Accordingly, it is an object of the present invention to provide an improved cryogenic distillation process and apparatus for the production of relatively high pressure oxygen and nitrogen products at elevated feed air pressure.

It is also an object of this invention to provide an improved cryogenic distillation process and apparatus for the production of oxygen and nitrogen resulting in a reduced power consumption and smaller equipment size.

It is, moreover, an object of the present invention to provide an improved process for the production of oxygen and nitrogen whereby the totality or a fraction of the feed air can be derived from a power turbine.

The above objects and others are provided by a cryogenic distillation process for the production of oxygen and nitrogen, which entails:

a) cooling at least a fraction of a cleaned, dried and compressed feed stream containing at least oxygen and nitrogen and introducing the same into a high pressure column, and separating the same into a nitrogen-rich liquid stream at the top of the column and an oxygen-rich stream at the bottom of the column, wherein the overhead of the high pressure column exchanges heat with both the bottom of the low pressure column and the bottom of an intermediate column, b) introducing the oxygen-rich stream into said intermediate column to afford a top liquid fraction A and a bottom liquid fraction B, the overhead of the intermediate column exchanging heat with the low pressure column at a location above the bottom reboiler of the low pressure column, wherein the pressure of the intermediate column is lower than the high pressure column but higher than the low pressure column, c) introducing liquid fractions A and B into the low pressure column as feed, d) feeding the nitrogen-rich liquid of step a) to the low pressure column as reflux, and e) recovering an oxygen-rich stream product at the bottom of the low pressure column and a low pressure nitrogen-rich stream at the top of the low pressure column.

BRIEF DESCRIPTION OF THE DRAWINGS

FIG. 1 illustrates an embodiment of the present invention using a stacked three column arrangement.

FIG. 2 illustrates an alternative embodiment of the present invention using a side column.

FIG. 3 illustrates the general integration of an air separation facility with a power turbine in accordance with the present invention.

FIG. 4 illustrates an alternative arrangement where the condenser of the intermediate column is detached from the low pressure column.

FIG. 5 illustrates the McCabe-Thiele diagrams for the present three-column process and the conventional two-column process.

DETAILED DESCRIPTION OF THE PREFERRED EMBODIMENT

In accordance with the present invention, an improved cryogenic distillation process for the production of oxygen and nitrogen is provided wherein a significant and advantageous reduction of power consumption and equipment size is attained.

In accordance with the present invention, it has been discovered that the use of a three-column process, as opposed to a conventional two-column process, affords a surprising improvement in oxygen recovery and power savings when elevated feed air pressures are available and when the products are needed at relatively high pressure. More particularly, the present process treats an the oxygen-rich liquid produced from a high pressure column in an intermediate column before distilling the resulting products in a final low pressure column.

The present invention is advantageous as the totality or a fraction of feed air can be derived from a power turbine. In order to restore the balance, nitrogen products from a cryogenic separation unit may be recompressed for reinjection into the power turbine loop. For example, compressed nitrogen may be mixed with air feed to a power turbine upstream of a combustion chamber before expansion for power recovery. Further, compressed nitrogen may be injected into a combustion chamber of a power turbine. Also, compressed nitrogen may be mixed with hot gas exiting the combustion chamber before expansion for power recovery.

By adding an intermediate column, it has been surprisingly discovered that the recovery of oxygen is significantly improved in a process where the feed air is available at relatively high pressure, and the products are needed at relatively high pressure. Further, an excellent recovery of oxygen can be obtained in a manner whereby power consumption and equipment size is advantageously reduced.

In more detail, the intermediate column used in accordance with the present invention has the lower end thereof in heat exchange with the top of the high pressure column, and has the upper end thereof in heat exchange with an intermediate location above the bottom tray of the lower pressure column. This intermediate column separates the oxygen-rich liquid produced at the bottom of the high pressure column into two liquid fractions which are then introduced as feeds to the low pressure column. The low pressure column still has the lower end thereof in heat exchange with the top of the high pressure column, therefore, its pressure will be essentially the same as the low pressure column of a classical double column process operated at the same air pressure.

Further, the nitrogen-rich liquid produced at the top of the high pressure column is introduced as reflux to the low pressure column. By performing an extra step of distillation in the intermediate column, it is found that the subsequent distillation in the low pressure column becomes much more efficient. A comparison of the McCabe-Thiele diagrams of the two-column process versus the present three-column process illustrates the advantageous improvement of the present invention, i.e., the operating lines of the three-column process are closer to the equilibrium curve indicating a much more efficient process. See FIG. 5.

In more detail, the process of the present invention may be described as follows.

The feed stream may be cleaned, dried and compressed in a conventional manner to remove carbon dioxide and water.

As used herein, the term "feed stream" means any gas mixture containing at least oxygen and nitrogen. For example, atmospheric air may be used as well as off-gas mixtures containing nitrogen and oxygen. Other gases, such as argon may, of course, also be present in the gas mixture.

Then, the clean, and dry and compressed feed stream is cooled and introduced into high pressure column, where it is separated into a nitrogen-rich vapor stream at the top and an oxygen-rich liquid stream at the bottom. The nitrogen-rich vapor at the top of the high pressure column is condensed at the bottom of both the low pressure and intermediate columns to form a nitrogen-rich liquid. A fraction of this liquid is used as reflux for the high pressure column and the remaining fraction of this liquid is fed to the low pressure column as reflux. Of course, some of this liquid may be recovered as product. A fraction of nitrogen-rich vapor at the top of the high pressure column can be recovered as medium pressure nitrogen product. The overhead of the high pressure column exchanges heat with both the bottom of the low pressure column and the bottom of the intermediate column Thereafter, the oxygen-rich liquid stream is then optionally cooled and introduced into the intermediate column to yield a top liquid fraction A and bottom liquid fraction B. The overhead of the intermediate column exchanges heat with the low pressure column at a location above the bottom reboiler of the low pressure column. The pressure of the intermediate column is lower than that of the high pressure column but higher than that of the low pressure column.

Then, either a totality or a fraction of liquid fractions A and B are introduced into the low pressure column as feed. If desired, liquid fractions A and B may be cooled prior to introduction into the low pressure column.

Finally, an oxygen-rich stream product is recovered at the bottom of the low pressure column and a low pressure nitrogen-rich stream is recovered at the top of the low pressure column.

For process refrigeration, it is acceptable to use any conventional arrangement, such as air expansion or nitrogen expansion, for example.

Generally, the air pressure for the feed stream in step a) after compression is in a range of about 8 to 20 bar absolute, with the preferred range being about 10 to 18 bar absolute. The intermediate column pressure will normally be at a pressure of about 3 to 15 bar absolute, with a preferred range of about 5 to 13 bar absolute. The low pressure column generally will have a pressure of about 1 to 8 bars absolute, with 2 to 7 bars absolute being preferred.

Generally, in introducing the clean and dry compressed air to the high pressure column, the high pressure column is maintained at the same pressure as in step a). The air feed is maintained close to the dew point.

The oxygen-rich stream product may, after recovery, be recompressed for further use.

Additionally, in accordance with the present invention it is advantageous if all or at least a fraction of the air feed stream is provided from a power turbine. However, many other embodiments of the present invention are also advantageous.

For example, it is advantageous to recompress at least a fraction of the low pressure nitrogen-rich stream of step f) for further use in an associated process, or to mix the recompressed nitrogen-rich stream with air feed to a power turbine upstream of a combustion chamber before expansion for power recovery.

Moreover, it is also advantageous to inject the recompressed nitrogen-rich stream into a combustion chamber of a power turbine, or to mix the recompressed nitrogen-rich stream with hot gas exiting a combustion chamber of a power turbine for power recovery.

Furthermore, in accordance with the present invention, it is advantageous if the recompressed nitrogen-rich stream is heated in an associated process before being expanded in a power turbine for power recovery.

Also, it has been found advantageous in accordance with the present invention to also treat at least a fraction of the oxygen-rich liquid stream in the intermediate column to produce extra feeds for the low pressure column.

Further, in accordance with another aspect of the present invention, a cryogenic distillation process is provided for the production of oxygen and nitrogen, which comprises:

a) cooling at least a fraction of a cleaned, dried and compressed feed stream containing at least oxygen and nitrogen and introducing the same into a high pressure column, and separating the same into nitrogen-rich stream at the top of the column, wherein the overhead of the high pressure column exchanges heat with both the bottom of the low pressure column and the bottom of an intermediate column;

c) introducing the oxygen-rich stream into the intermediate column to afford a top liquid fraction A and bottom liquid fraction B, vaporizing a fraction of said liquid fraction B in the overhead condenser of the intermediate column to condense the overhead stream of the intermediate column, and then feeding the vaporized fraction of the liquid fraction B and the remaining fraction of the liquid fraction B to the low pressure column; and d) introducing the liquid fraction A into the low pressure column as feed.

The present invention will now be further illustrated by reference to an example which is provided solely for the purpose of illustration and is not intended to be limitative.

In accordance with all of the processes and apparati of the present invention, trays and/or structured packings can be used as mass transfer means between the liquid and gas fractions in the various columns.

As used herein, the term "tray" refers to any means or device for effecting intimate contact and mass transfer between a descending liquid phase and ascending vapor phases. These various tray are well known to those skilled in the art.

The term "tray" as used herein also includes means known such as structured packing or equivalent means which are devices equivalent to trays to effect such intimate contact for cryogenic air separation. Examples of structured packing are disclosed, e.g. in U.S. Pat. Nos. 2,047,444; 4,186,156 and 4,296,050, each patent being incorporated herein by reference in the entirety, and Ellis et al, *Trans. Instn. Chem. Engrs.*, 41, 1963, known as Goodloe packings. Such structured packing is known as means to promote liquid and/or vapor mixing in a direction perpendicular to the primary flow direction, i.e. the vertical direction. Furthermore, a combination of trays and packing can be used as mass transfer means. Example The cryogenic distillation process of the present invention can be compared to the process of U.S. Pat. No. 4,224,045.

In the following example, the same air feed pressure of about 16 bars absolute is used for both processes, and the same product from cold box pressure is used for both processes, i.e., about 5 bar absolute. Also, the following assumptions are made:

1) that air is compressed from barometric pressure to the required pressure, 2) that the oxygen product is compressed from a cold box outlet pressure to 35.5 bar absolute, 3) that the nitrogen product is compressed from the cold box outlet pressure to the same pressure as the feed, and 4) that the same efficiency exists for all compressors.

TABLE 1

|  | U.S. Pat. No. 4,224,045 | Present Process | % Improvement |
|---|---|---|---|
| % recovery at 95% $O_2$ Purity | 91.2% | 99.4% | 9% |
| % recovery at 98% $O_2$ Purity | 84% | 93.4% | 11.2% |
| Compression power for 95% $O_2$ Purity | 100 | 92 | 8% |
| Compression power for 98% $O_2$ Purity | 100 | 91 | 9% |

As may be seen in Table 1, the present process yields a recovery of 99.4% for a 95% purity of oxygen versus a 91.2% recovery of the conventional two-column process which represents an improvement of 9%. A comparison of compression power yields an improvement of 8% over the conventional two-column process.

The above 9% and 8% improvements for recovery and power are, indeed, very high for a cryogenic process. The present process, therefore, represents a radical and surprising break-through in the application of cryogenic technology.

It is noted that "recovery" is defined herein as the ratio of oxygen contained in the product over the contained oxygen in the feed air.

In order to further describe both the processes and apparati of the present invention, reference will now be made to FIGS. 1-5.

In FIG. 1, a cleaned, dried and compressed feed stream containing at least oxygen and nitrogen is provided through input means to conduit (10), whereinafter at least a fraction of this feed stream is fed through heat exchange means (11) and then to the high pressure column (13) via conduit (12). The remaining fraction of the feed stream is fed via conduit (14) either directly to the low pressure column or optionally through booster compressor (15) and expansion turbine (17) and then to the low pressure column (19) via conduit (18).

In the high pressure column, the feed stream is separated into a nitrogen-rich liquid stream at the top of the column and an oxygen-rich stream at the bottom of the column, wherein the overhead of the high pressure column exchanges heat with both the bottom of the low pressure column and the bottom of an intermediate column (28).

Then, an oxygen-rich stream from the bottom of the high-pressure column is fed via conduit (20), optionally through liquid subcooler (27), to the intermediate column (28), to provide a top liquid fraction A and a bottom liquid fraction B, the overhead of the intermediate column (28) exchanging heat with the low pressure column, wherein the pressure of the intermediate column is lower than the high pressure column (13) but higher than the low pressure column (19).

Liquid fractions A and B are then introduced into the low pressure column (19) as feed. Notably, liquid fraction A is passed from the top of the intermediate column (28) to conduit (22), optionally passing through liquid subcooler (27), and is fed to the low pressure column (19). Liquid fraction (B) is passed from the bottom of the intermediate column (28) to conduit (21), optionally passing through liquid subcooler (27) and is fed to the low pressure column (19).

Then, the nitrogen-rich liquid produced in step a) is fed via conduit (23), optionally through liquid subcooler (27), to the low pressure column (19) as reflux. Thereafter, an oxygen-rich stream at the bottom of the low pressure column is recovered via conduit (25) from the column and fed through heat exchanging means (11) prior to ultimate recovery of gaseous oxygen product.

Additionally, a nitrogen-rich stream at the top of the low pressure column is recovered via conduit (24), and optionally passed through liquid subcooler (27), and then necessarily passed through heat exchanging means (11), via conduit (30) prior to ultimate recovery of gaseous nitrogen product.

FIG. 2 illustrates essentially the same process as is depicted in FIG. 1, however, a side arm column (31) is used instead of intermediate column (28). The minor modification show would be readily understood by the artisan in view of FIG. 1. The remaining elements depicted in FIG. 2 are as depicted in FIG. 1.

FIG. 3 illustrates the general integration of an air separation facility with a power turbine in accordance with the present invention. As may be seen, a medium pressure nitrogen stream may be produced from the process to be fed to an intermediate compression stage to further improve the power savings.

Generally, a feed stream containing at least nitrogen and oxygen is fed through a compressor (10) through input means (1) and a portion thereof is then fed through conduit (11) and conduit (26) to a combustion chamber. The remaining portion of the feed stream, such as atmospheric air is fed via conduits (12) and (13) to cooling and purification means (15). At this stage, the feed stream may be enhanced by using an auxiliary compressing means (14) using a feed stream also containing at least oxygen and nitrogen, such as atmospheric air. This auxiliary feed stream is also passed through cooling and purification means (15).

Then, the feed stream passing through conduit (16) is fed to the feed stream separation facility wherein a nitrogen stream, a medium-pressure nitrogen stream (MPN$_2$) and a gaseous oxygen stream are produced. The nitrogen stream and medium pressure nitrogen stream exit via conduits (21) and (22), respectively, and a fed, respectively, through compression stages (23) and (24) and then to conduit (25) for feeding into combustion chamber (27). Fuel is introduced to the combustion chamber (27) via conduit (28). Then, hot gas from the combustion chamber is fed via conduit (29) to gas turbine (31), whereinafter a portion of the hot exhaust is used to drive a power turbine (31) and the remaining portion is fed to conduit (32) for venting. Power will be generated in generator (30).

Additionally, although not depicted in FIG. 3, the exhaust in conduit (32) may be utilized to generate steam for power generation.

In more detail, a gas turbine arrangement may be used wherein compressed feed air or compressed mixtures containing nitrogen and oxygen are mixed with fuel and combusted. In essence, compressed nitrogen derived by separation in any kind of cryogenic "cold box" is injected into a combustion chamber to control the pressure in the combustion chamber and to minimize the formation of nitrogen oxides (NO$_x$).

The hot combustion mixture can also be quenched with nitrogen gas and the resulting gaseous mixture is then expanded in a power turbine for power recovery. Exhaust gas from the gas turbine is usually then passed to a steam generator where the residual heat is recovered for steam production. The steam produced may be used in other sections of the process or can be further expanded in the steam turbines to recover the additional power.

Thus, the present invention also provides an apparatus and process for generating steam for power generation.

The present apparatus for generating steam for power generation, entails:

a) feed stream input means upstream of a combustion chamber for inputting a compressed feed stream containing at least nitrogen and oxygen to a combustion chamber, b) a combustion chamber having fuel input means, c) an apparatus for producing oxygen and nitrogen from a feed stream containing at least oxygen and nitrogen, which comprises a triple rectification column comprising a higher pressure column having feed stream input means, heat exchange means joining the upper end of the higher pressure column and the lower end of both a low pressure and an intermediate column, separate conduit means for feeding nitrogen-rich liquid from the higher pressure column to the lower pressure column and oxygen-rich liquid to the intermediate column, separate conduit means for feeding the products of the intermediate column to the low pressure column as feeds, separate conduit means for discharging nitrogen-rich gas from the low pressure column, separate conduit means for discharging an oxygen-rich stream from the low pressure column and wherein the top of the intermediate column is in heat exchange relation with the low pressure column at a location above a bottom reboiler of the low pressure column, the apparatus having at least one separate conduit for feeding nitrogen to the combustion chamber and separate conduit means for gaseous oxygen product, d) a power turbine downstream of the combustion chamber in fluid connection therewith, and e) generating means driven by the power turbine.

As indicated above, exhaust gas from the power turbine is usually passed to the steam generator where residual heat is recovered for steam production.

As indicated above, exhaust gas from the power turbine is usually passed to the steam generator where residual heat is recovered for steam production.

The present process for generating steam for power generation, entails:

a) feeding a first fraction of a feed stream containing at least nitrogen and oxygen, and fuel to a combustion chamber, b) feeding at least the remaining portion of the feed stream to a cryogenic apparatus wherein the feed stream is cooled, cleaned and dried and oxygen and nitrogen separated therefrom, c) passing hot exhaust gas from the combustion chamber to a gas turbine downstream of the combustion chamber and in fluid connection therewith, and d) passing exhaust gas from the gas turbine to a steam generator to recover residual heat for steam production.

Notably, in the above process, oxygen and nitrogen are separated from the feed stream using the present cryogenic process. Further, in the process of generating steam, a fraction of feed stream, such as air, going to the process is obtained from a compressor means driven by a gas turbine.

As a fuel, while any fuel may be used, it is advantageous to use a gasification means, such as a coal gasifier, to generate a fuel gas mixture of $H_2$, CO and $CH_4$, for example, which results from feeding oxygen from a cryogenic pressure at a pressure of about 20-35 bar to the coal gasifier. The resulting fuel is fed to the combustion chamber.

The cryogenic process also furnishes nitrogen to the combustion chamber at a pressure of about 8-20 bar, i.e., such as about 16 bar. Notably, in furnishing nitrogen to the combustion chamber, the mass balance can be restored from the depletion resulting from the extraction of air for the cryogenic feed stream.

In FIG. 4, an alternative arrangement is depicted wherein the condenser of the intermediate column is detached from the low pressure column. FIG. 4 illustrates essentially the same process as is depicted in FIG. 1, however, the condenser of the intermediate column (28) is detached from the low pressure column (19). This condenser is fed by a fraction of the liquid produced at the bottom of the intermediate column. The minor modifications shown would be readily understood by the artisan in view of FIG. 1.

FIG. 5 illustrates the McCabe-Thiele diagrams for the present three-column process and the conventional two-column process, clearly showing the advantageous nature of the present process.

Thus, in accordance with the present invention both processes and apparati therefor are provided.

For example, the apparatus depicted in FIG. 1 may be described as an apparatus for producing oxygen and nitrogen having three distillation columns, which comprises a triple fractionating means comprising a higher pressure column having feed stream input means, heat exchange means joining the upper end of the higher pressure column and the lower end of both a low pressure and an intermediate column, separate conduit means for feeding nitrogen-rich liquid from the higher pressure column to the lower pressure column and oxygen-rich liquid to the intermediate column, separate conduit means for feeding the products of the intermediate column to the low pressure column as feeds, separate conduit means for discharging nitrogen-rich gas from the low pressure column, separate conduit means for discharging oxygen product from the low pressure column, and wherein the top of the intermediate column is in heat exchange relation with the low pressure column at a location above a bottom reboiler of the low pressure column.

The apparati of FIG. 2 may be described similarly as FIG. 1.

The present invention also provides an apparatus for producing oxygen and nitrogen having three distillation columns, which entails a triple rectification column comprising a higher pressure column having feed stream input means, heat exchange means joining the upper end of the higher pressure column and the lower end of both a low pressure and an intermediate column, separate conduit means for feeding nitrogen-rich liquid from the higher pressure column to the lower pressure column and oxygen-rich liquid to the intermediate column, separate conduit means for feeding the products of the intermediate column to the low pressure column as feeds, separate conduit means for discharging nitrogen-rich gas from the low pressure column, separate conduit means for discharging an oxygen-rich stream from the low pressure column, separate conduit means for transferring liquid produced at the bottom of the intermediate column to the overhead of the intermediate column and separate conduit means for feeding resulting vaporized liquid from the overhead condenser to the low pressure column.

The apparati of FIG. 4 may also be described similarly except that the side arm intermediate column is not in heat exchange relation with the low pressure column. Separate conduit means is provided to feed the liquid produced at the bottom of the intermediate column to its overhead condenser. The respective arrangements may be readily appreciated from FIG. 4.

Having described the present invention, it will now be apparent to one of ordinary skill in the art that many changes and modifications can be made to the above-described embodiments without departing from the spirit and the scope of the present invention.

What is claimed as new and desired to be secured by Letters Patent of the United States is:

1. A cryogenic distillation process for production of oxygen and nitrogen, which comprises:
    a) cooling at least a fraction of a cleaned and dried feed stream containing at least oxygen and nitrogen and introducing the feed stream into a high pressure column, and separating the feed stream into a nitrogen-rich stream at a top portion of the high pressure column and an oxygen-rich stream at a bottom portion of the column, wherein an overhead portion of the high pressure column exchanges heat with both a bottom portion of a low pressure column and a bottom portion of an intermediate column,
    b) introducing at least a fraction of the oxygen-rich stream into said intermediate column to afford a top liquid fraction A and a bottom liquid fraction B, an overhead of the intermediate column exchanging heat with the low pressure column at a location above the bottom portion of the low pressure column, wherein the intermediate column pressure is lower than the high pressure column pressure but higher than the low pressure column pressure,
    c) introducing at least a fraction of the liquid fractions A and B into the low pressure column as feed,
    d) feeding at least a fraction of the nitrogen-rich stream of step b) to a low pressure column as reflux, and
    e) recovering an oxygen-rich stream product at the bottom of the low pressure column and a nitrogen-rich stream at the top of the low pressure column.

2. The cryogenic distillation process of claim 1, wherein at least a portion the air feed stream is provided from a power turbine.

3. The cryogenic distillation process of claim 1, which further comprises recompressing at least a fraction of the pressure nitrogen-rich stream of step e) for further use in an associated process.

4. The cryogenic distillation process of claim 3, wherein said recompressed nitrogen-rich steam is mixed with air feed to a power turbine upstream of a combustion chamber before expansion for power recovery.

5. The cryogenic distillation process of claim 3, wherein said recompressed nitrogen-rich stream is injected into a combustion chamber of a power turbine.

6. The cryogenic distillation process of claim 3, wherein said recompressed nitrogen-rich stream is mixed with hot gas exiting a combustion chamber of a power turbine for power recovery.

7. The cryogenic distillation process of claim 1, wherein said feed stream of clean and dry compressed air is at a pressure in the range of about 8–20 bar absolute.

8. The cryogenic distillation process of claim 7, wherein said pressure is in the range of 10–18 bar absolute.

9. The cryogenic distillation process of claim 1, wherein said intermediate column is operated at a pressure in the range of about 3–15 bar absolute.

10. The cryogenic distillation process of claim 9, wherein said pressure is in the range of about 5–13 bar absolute.

11. The cryogenic distillation process of claim 1, wherein the low pressure column is operated at a pressure column is operated at a pressure in the range of about 1–8 bar absolute.

12. The cryogenic distillation process of claim 2, wherein said pressure is in the range of about 2–7 bar absolute.

13. The cryogenic distillation process of claim 3 wherein at least a fraction of said recompressed nitrogen-rich stream is heated in an associated process before being expanded in a power turbine for power recovery.

14. The cryogenic distillation process of claim 1, which further comprises treating at least a fraction of the oxygen-rich liquid stream in the intermediate column.

15. A cryogenic distillation process for the production of oxygen and nitrogen, which comprises:
a) cooling at least a portion of a cleaned, dried and compressed feed stream containing at least oxygen and nitrogen and introducing the same into a high pressure column, and separating the same into nitrogen-rich stream at the top of the column and an oxygen-rich stream at the bottom of the column, wherein the overhead of the high pressure column exchanges heat with both the bottom of the low pressure column and the bottom of an intermediate column;
b) introducing at least a fraction of the oxygen-rich stream into said intermediate column to afford a top liquid fraction A and a bottom liquid fraction B, vaporizing a fraction of said liquid fraction B in the overhead condenser of the intermediate column to condense the overhead stream of the intermediate column, and then feeding the vaporized fraction of said liquid fraction B and at least part of the remaining portion of said liquid fraction B to the low pressure column;
c) introducing at least a fraction of the liquid fraction A into the low pressure column as feed; and
d) recovering an oxygen-rich stream product at the bottom of the low pressure column and a nitrogen-rich stream at the top of the low pressure column.

16. The cryogenic distillation process of claim 15, wherein at least a portion of the air feed stream is provided from a power turbine.

17. The cryogenic distillation process of claim 15, wherein said feed stream of clean and dry compressed air is at a pressure in the range of about 8–20 bar absolute.

18. The cryogenic distillation process of claim 17, wherein said pressure is in the range of 10–18 bar absolute.

19. The cryogenic distillation process of claim 15, wherein said intermediate column is operated at a pressure in the range of about 3–15 bar absolute.

20. The cryogenic distillation process of claim 19, wherein said pressure is in the range of about 5–13 bar absolute.

21. The cryogenic distillation process of claim 15, wherein the low pressure column is operated at a pressure in the range of about 1–8 bar absolute.

22. The cryogenic distillation process of claim 21, wherein said pressure is in the range of about 2–7 bar absolute.

23. The cryogenic distillation process of claim 15, which further comprises recovering a medium pressure nitrogen stream from the high pressure column.

24. The cryogenic distillation process of claim 2, wherein at least a fraction of the medium pressure and low pressure nitrogen streams is recompressed for further use.

25. The cryogenic distillation process of claim 24, wherein at least a fraction of the medium pressure and low pressure nitrogen streams is recompressed for further use.

26. An apparatus for producing oxygen and nitrogen having three distillation columns, which comprises a triple rectification column comprising a higher pressure column having feed stream input means, heat exchange means joining an upper end of the higher pressure column and a lower end of both a low pressure and an intermediate column, separate conduit means for feeding nitrogen-rich liquid from the higher pressure column to the lower pressure column and oxygen-rich liquid to the intermediate column, separate conduit means for feeding the products of the intermediate column to the low pressure column as feeds, separate conduit means for discharging nitrogen-rich gas from the low pressure column, separate conduit means for discharging an oxygen-rich stream from the low pressure column, and wherein a top portion of the intermediate column is in heat exchange relation with the low pressure column at a location above a bottom reboiler of the low pressure column.

27. The apparatus of claim 26, wherein said intermediate column in heat exchange relation with the low pressure column is replaced with a side arm column.

28. The apparatus of claim 26, wherein said intermediate column in heat exchange relation with the low pressure column is replaced with a detached intermediate condenser.

29. An apparatus for producing oxygen and nitrogen having three distillation columns, which comprises a triple rectification column comprising a higher pressure column having feed stream input means, heat exchange means joining an upper end of the higher pressure column and a lower end of both a low pressure and an intermediate column, separate conduit means for feeding nitrogen-rich liquid from the higher pressure column to the lower pressure column and oxygen-rich liquid to the intermediate column, separate conduit means for feeding products of the intermediate column to the low pressure column as feeds, separate conduit means for discharging nitrogen-rich gas from the low pressure column, separate conduit means for discharging an oxygen-rich stream from the low pressure column, separate conduit means for transferring liquid produced at a bottom of the intermediate column to an overhead of the intermediate column and separate conduit means for feeding resulting vaporized liquid from an overhead condenser to the low pressure column.

* * * * *